(12) United States Patent
Jongsma et al.

(10) Patent No.: US 12,299,925 B2
(45) Date of Patent: May 13, 2025

(54) METHOD AND SYSTEM FOR LOCATING A LIGHT SOURCE

(71) Applicant: FNV IP B.V., Leidschendam (NL)

(72) Inventors: Arnoud Marc Jongsma, Vijfhuizen (NL); Joachim Ulrich Seibert, Leidschendam (NL)

(73) Assignee: FNV IP B.V., Leidschendam (NL)

( * ) Notice: Subject to any disclaimer, the term of this patent is extended or adjusted under 35 U.S.C. 154(b) by 322 days.

(21) Appl. No.: 17/792,153

(22) PCT Filed: Jan. 27, 2021

(86) PCT No.: PCT/NL2021/050049
§ 371 (c)(1),
(2) Date: Jul. 12, 2022

(87) PCT Pub. No.: WO2021/154072
PCT Pub. Date: Aug. 5, 2021

(65) Prior Publication Data
US 2023/0054256 A1 Feb. 23, 2023

(30) Foreign Application Priority Data
Jan. 28, 2020 (NL) .................... 2024773

(51) Int. Cl.
*G06T 7/73* (2017.01)
*B64D 47/00* (2006.01)
(Continued)

(52) U.S. Cl.
CPC ............... *G06T 7/74* (2017.01); *B64D 47/00* (2013.01); *B64F 1/20* (2013.01); *G06T 7/66* (2017.01);
(Continued)

(58) Field of Classification Search
CPC .. G06T 7/74; G06T 7/66; G06T 15/06; G06T 15/205; G06T 2207/10016;
(Continued)

(56) References Cited

U.S. PATENT DOCUMENTS 9,134,174 B2    9/2015  Jungwirth
2014/0192367 A1*  7/2014  Jungwirth ................. G01J 3/50
                                                              356/402

(Continued)

FOREIGN PATENT DOCUMENTS

WO    2007/012839 A2    2/2007
WO    2017/184252 A1   10/2017

*Primary Examiner* — Iriana Cruz
(74) *Attorney, Agent, or Firm* — Polsinelli PC

(57) ABSTRACT

A method and system for locating a high-intensity target light source (26) from an elevated observation location (Po), for instance in an aircraft. The target light source is located at/near an earth surface portion (30) and amongst reference light sources (16, 24, 25) arranged along the surface portion. This target light source emits light (28) with a peak radiant intensity that exceeds the intensity of the reference light sources by at least one order of magnitude. The method includes:
acquiring, with an image recording device located at the observation location, images of the light and light emitted the reference light sources;
comparing the images and a digital ground map (50) that includes representations of the surface portion and of structures (20, 22) associated with the reference light sources, and
estimating a location (Pt) of the target light source relative to the reference light sources, based on the comparison.

14 Claims, 5 Drawing Sheets

(51) Int. Cl.
- *B64F 1/20* (2006.01)
- *G06T 7/66* (2017.01)
- *G06T 15/06* (2011.01)
- *G06T 15/20* (2011.01)
- *H04N 5/232* (2006.01)
- *H04N 23/698* (2023.01)
- *H04N 5/77* (2006.01)

(52) U.S. Cl.
CPC ............ *G06T 15/06* (2013.01); *G06T 15/205* (2013.01); *H04N 23/698* (2023.01); *G06T 2207/10016* (2013.01); *G06T 2207/10032* (2013.01); *G06T 2207/30241* (2013.01); *H04N 5/77* (2013.01)

(58) Field of Classification Search
CPC ........... G06T 2207/10032; G06T 2207/30241; B64D 47/00; B64F 1/20; H04N 23/698; H04N 5/77; G08G 5/0021; G08G 5/025; G08G 5/0086; G01S 2205/03; G01S 7/4804; G01S 5/16

See application file for complete search history.

(56) References Cited

U.S. PATENT DOCUMENTS

| | | | |
|---|---|---|---|
| 2015/0153160 A1* | 6/2015 | James | G01C 21/206 356/614 |
| 2015/0195492 A1* | 7/2015 | Leerentveld | H04M 3/567 348/14.03 |
| 2015/0195495 A1 | 7/2015 | Mcewan et al. | |
| 2017/0328986 A1 | 11/2017 | Chankaya et al. | |
| 2017/0334578 A1 | 11/2017 | Fleck et al. | |
| 2018/0010911 A1* | 1/2018 | Fang | G01C 3/18 |
| 2020/0300637 A1* | 9/2020 | Chiu | G05D 1/027 |
| 2021/0192908 A1* | 6/2021 | Kojima | H04N 7/181 |
| 2021/0201891 A1* | 7/2021 | Lyu | G10L 25/63 |
| 2023/0348115 A1* | 11/2023 | Jung | B64G 1/66 |

\* cited by examiner

METHOD AND SYSTEM FOR LOCATING A LIGHT SOURCE

TECHNICAL FIELD

The invention relates to a method and a system for locating a target light source from a remote observation location. Furthermore, the invention relates to an aircraft including the proposed system, to a computer program product arranged to perform the proposed method, and to a computer readable medium comprising such a computer program.

BACKGROUND ART

Laser interference to aviation, whether intentional or accidental, is a significant hazard to the safety of air traffic, both civil and military. The widespread availability of high-intensity light sources (e.g. laser pointers) and other sources of concentrated light has led to an increasing number of attacks on aircraft, particularly near airports and high air traffic areas. Such attacks often occur during low lighting conditions, and when aircraft are flying at low altitudes. An attack may cause harm to the pilot and in some cases to the aircraft. A high intensity light directed at a pilot cabin may blind pilots and effectively disable them during critical stages of the flight, such as during take-off or landing. Existing legislation heavily penalizes laser attackers, but these mechanisms have not been effective in discouraging these individuals. The frequency and severity of attacks continue to rise.

In this context, the term "high intensity" refers to light sources that have a power density exceeding maximum permissible exposure (MPE) levels for human eye tissue (retina, cornea, etc.). The target light source that is to be observed and localized may have a point-like character, in the sense that it has a single intensity maximum and an intensity distribution that is localized within a small region around this maximum. For instance, lasers pointers of class 2 or higher (IEC 60825-1) typically generate a highly collimated beam (e.g. half power beam width in the order of) 0.05° with output power of one milliwatt or more, which exceeds MPE levels when observed with the naked eye for prolonged times.

The attacker is typically positioned on or near the ground, at a location within a large area surrounding an airport. Often, such areas are heavily populated. Locating laser attackers on the ground can be very difficult, not only because of the small size of the light source and the vast number of potential attack locations, but also because the attacker can move within the area during and/or after the attack. It has been found that laser and similar attacks can be more effectively detected from elevations (e.g. from an airborne aircraft), preferably within a light projection zone (e.g. by an aircraft being under attack).

Patent document US2017/0328986A1 describes a detector system, which includes a laser detector for detecting laser light emitted from a laser source, a GPS receiver for determining a location of the aircraft, a tilt measurement device for determining a tilt angle of the aircraft, a digital ground map, and a processor. The processor is configured to determine a line of sight from the aircraft to the laser source, based on the detected laser light, the tilt angle, and the GPS location, and to determine a point of intersection of the line of sight with the digital ground map, to derive ground coordinates for locating the laser source. This known apparatus requires accurate GPS positioning and tilt measurements in order to obtain a reliable estimate of ground coordinates.

A system with an integrated GNSS receiver may cause difficulties (e.g. inaccurate readings) when used inside the body of an airplane. By including an accurate sensor for measuring camera orientation (e.g. a north-seeking inertial motion unit), the system becomes costly and bulky. Alternative system implementations that rely on position readings from the airplane's sensors need an interface to those sensors. In practice, such an interface is difficult to establish in view of required compliancy and safety certifications. In addition, with such an external interface, the position, attitude, and timing offsets of the system relative to the aircraft's sensors must be recalibrated every time the camera system changes position relative to the airplane.

It would be desirable to provide a system and method for locating a light source that yields good positioning accuracy, but which does not necessarily rely on direct measurements of position and attitude for the system.

SUMMARY OF INVENTION

Therefore, according to a first aspect of the invention, there is provided a method for locating a target light source. This target light source is located at or near a portion of the earth's surface and amongst a plurality of reference light sources that are arranged along the surface portion. This target light source emits light with a peak radiant intensity that exceeds the peak radiant intensity of the reference light sources by at least one order of magnitude. The proposed method comprises:
  acquiring, with an image recording device located at an observation location above the surface portion, one or more images of the light and light emitted by a portion of the reference light sources;
  comparing, with a processing unit, the image(s) and a digital ground map (DGM), wherein the DGM includes digital representations of the surface portion and of structures associated with the reference light sources, and
  estimating, with the processing unit, a location of the target light source relative to the reference light sources, based on the comparison between the image(s) and the DGM.

In this context, the term "radiant intensity" refers to the power density per solid angle of the light emitted by the light source. The target light source is expected to have a point-like character, in the sense that the emitted light propagates as a pencil beam distribution along a nominal axis, and has a localized intensity distribution with an intensity maximum ("peak intensity") at this axis and which fall off with transversal distance from this axis.

The term "near the earth surface" refers herein to heights ranging between ground level and typical height for buildings and infrastructure. The observation location may for instance be at or in an airborne aircraft. The term "remote" as a qualifier for the distance of the observer above the earth surface refers herein to distances exceeding characteristic building heights (e.g. several tens to hundreds of metres) to typical aircraft flight altitudes (which may range up to 18 kilometres).

The proposed method allows accurate mapping between image coordinates and earth-related coordinates, by registering the acquired image(s) and the spatial information of stationary structures associated with reference light sources in the digital ground map, in order to derive geo-referenced positioning information for the reference light sources observed in the acquired image(s). The resulting registration mapping parameters allow accurate determination of positions for abnormal target light sources appearing in the image(s), relative to the geo-referenced ground map. The system does not necessarily rely on positioning information obtained from sensors that directly measure position, thus obviating the need for bulky sensors and/or spatial calibration between the image recording device and any positioning sensor.

In embodiments, the surface portion includes roads, and the reference light sources include road lighting arranged along the roads, and/or automotive lighting of vehicles moving on the roads. The light from street lighting and automotive lighting clearly demarcates the geostationary layout of the roads relative to the earth surface. The geographical properties of the roads may be detected by optical imaging of such light sources, and may be compared to road patterns that are included in the DGM, without needing detailed position information for the street lighting and/or vehicle lighting.

Alternatively or in addition, the imaged portion of the earth surface may include a runway of an airport. In this case, the plurality of reference light sources may include a plurality of runway approach lights arranged in a known spatial distribution.

In embodiments wherein the target light source is a handheld laser device, the method may further include pre-processing of a temporal sequence of the images, in order to detect a first occurrence of impingement by the laser beam and trigger the processing unit to transition from a dormant mode to a locating mode, and/or in order to identify approximate image pixel coordinates for the peak intensity associated with the light emitted by the laser device. This detection and/or identification may for instance include a determination whether the peak intensity of an erratic light source (which is suspected to be the laser) exceeds peak intensities of the reference light sources by at least one order of magnitude in an individual image. This detection and/or identification may further include a determination whether the peak intensity of the erratic light source fluctuates in time by at least one order of magnitude (or preferably at least two orders of magnitude) throughout the sequence of the images. This latter determination relates to the expected inability of the offending person to point the laser beam steadily towards the observation location (which may gradually change, for instance when this location is associated with a moving aircraft). As a result, the impinging laser beam may swing back and forth or around the observation location in a repeated manner, which causes a peak irradiance perceived by the image recording device to vary in time by such a factor of at least 10 (or 100). The swinging motion of the laser beam is expected to be irregular in time, and to deviate from light sources that exhibit regular oscillatory intensity variations (e.g. blinking lights associated with the roads or the runways or sweeping beams from lighthouses). The detection and/or identification step may therefore further include a frequency component analysis, in which high intensity light signals that fluctuate in a periodic manner in the temporal sequence of images are rejected and ignored in the detection/identification of target light sources.

In embodiments, the DGM is geo-referenced relative to an earth-fixed coordinate system, and the structures associated with the reference light sources can be considered geostationary. The method may then further include determining geographic coordinates for the estimated location of the target light source, based on the comparison between the image(s) and the DGM. The estimated location may for instance be expressed in geographic coordinates including longitude and latitude, and possibly also the elevation, of the position of the beam source in earth-fixed coordinates.

Optionally, the derived geographic coordinates for the estimated location of the target source may be communicated directly to authorities, for instance by transmission using a wireless communication unit.

In embodiments, comparison of the image(s) and the DGM includes:
  iteratively generating view projection images from the DGM, each view projection image being representative of a specific location and viewing angle for the image recording device;
  for each generated view projection image, comparing the view projection image to at least one of the images, and calculating a degree of correspondence;
  for the at least one of the images, identifying a closest projection image that has a highest degree of correspondence with said one image;
  deriving viewing transformation parameters for the closest projection image, and
  Deriving geographic coordinates for the estimated location for the target light source, from the location of the target light source in the image, the viewing transformation parameters, and the geo-referenced DGM.

In further embodiments, comparing of the image(s) and the DGM further includes, prior to iteratively generating view projection images:
  accessing a set of initial view projection images generated from the DGM, the view projection images representative of typical locations and viewing angles for an image recording device on-board the aircraft, based on a predetermined flight trajectory for the aircraft;
  comparing each of the set of initial view projection image to at least one of the images, and calculating a set of initial degrees of correspondence;
  identifying from the set a closest initial view projection image having a highest initial degree of correspondence with said one image;
  obtaining course viewing transformation parameters for the closest projection image, and
  using the course viewing transformation parameters as initialization values for the iteratively generating of view projection images from the DGM.

In embodiments, the method further comprises pre-processing the image(s) to exclude from the image(s) intensity information associated with the light from the target light source while retaining intensity information associated with the plurality of reference light sources. Comparing of the image(s) and the DGM may then be based on the intensity information associated with the plurality of reference light sources, while ignoring intensity information associated with the light from the target light source.

If the exposure time for the image recording device would be adjusted for a night scene (including tens to hundreds of reference lights), a very bright target light source (e.g. a laser pointer) aimed at the image recording device would saturate the image sensor, and create a wide overexposed light blob on the image. In practice however these lasers are usually pointed manually at a moving aircraft, so they usually appear as momentary flashes of bright light, as the offender cannot keep the laser pointed stable enough. From these bright flashes, it is obvious that it is a laser and the approximate position. To derive the coordinates of the source, it is preferred to use one of the subsequent images in the video stream, where the laser intensity has dropped of sufficiently not to overexpose the image sensor.

In further embodiments, estimating the location of the target light source includes:

identifying, in the image, peak intensity coordinates associated with the light from the target source;

for said image, deriving an associated optical centre and viewing axis for the image recording device relative to the reference frame of the DGM, based on the viewing transformation parameters derived for the closest projection image;

using optical ray tracing to calculate a point of intersection between, on the one hand, a nominal axis extending through the peak intensity coordinates and parallel with the viewing axis, and on the other hand, the digital representation of the surface portion in the DGM, and determining geographic coordinates for the point of intersection, and equating the geographic coordinates with the estimated location of the target light source.

In yet a further embodiment, the DGM further includes three-dimensional digital representations of buildings that are located in or on the portion of the earth surface. In this case, estimating the location of the target light source may further include:

using optical ray tracing to calculate a point of intersection between, on the one hand, a nominal axis extending through the peak intensity coordinates and parallel with the viewing axis, and on the other hand, the digital representations of the surface portion and the buildings in the DGM, and in the case that the nominal axis first intersects a digital representation of a target building in the DGM, determining geographic coordinates including height for the point of intersection, the geographic coordinates optionally including an estimate for the chamber and floor number in the target building.

In a second aspect of the invention, and in accordance with the advantages and effect described herein above, there is provided a system including an image recording device and a processing unit that are jointly configured to execute the method according to the first aspect.

In embodiments, the image recording device may be mounted on a lower side on or in the aircraft fuselage, with the optical axis pointing downwards. To increase detection effectiveness for laser attacks that are aimed directly at the cockpit, a preferred area for the image recording device may be the near the cockpit on/in the lower side of the fuselage. Other mounting positions (e.g. on the side, front, or top of the aircraft) may be selected. In alternative embodiments, the image recording device may be located behind a window of the aircraft (e.g. held in position behind a window of the cockpit or of a passenger cabin), and/or form an integral part of a smartphone, tablet, or other handheld computing or electronic device.

The image recording device may have an ultra-wide field of view with an azimuthal coverage of 360° around a central optical axis and an elevational coverage ranging from 0° to at least 90° relative to the optical axis.

Further aspects of the invention involve an aircraft comprising a system according to the second aspect, a computer program product with instructions for carrying out a method in accordance with the first aspect, and a computer readable medium including such a computer program product.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

Figure 1:
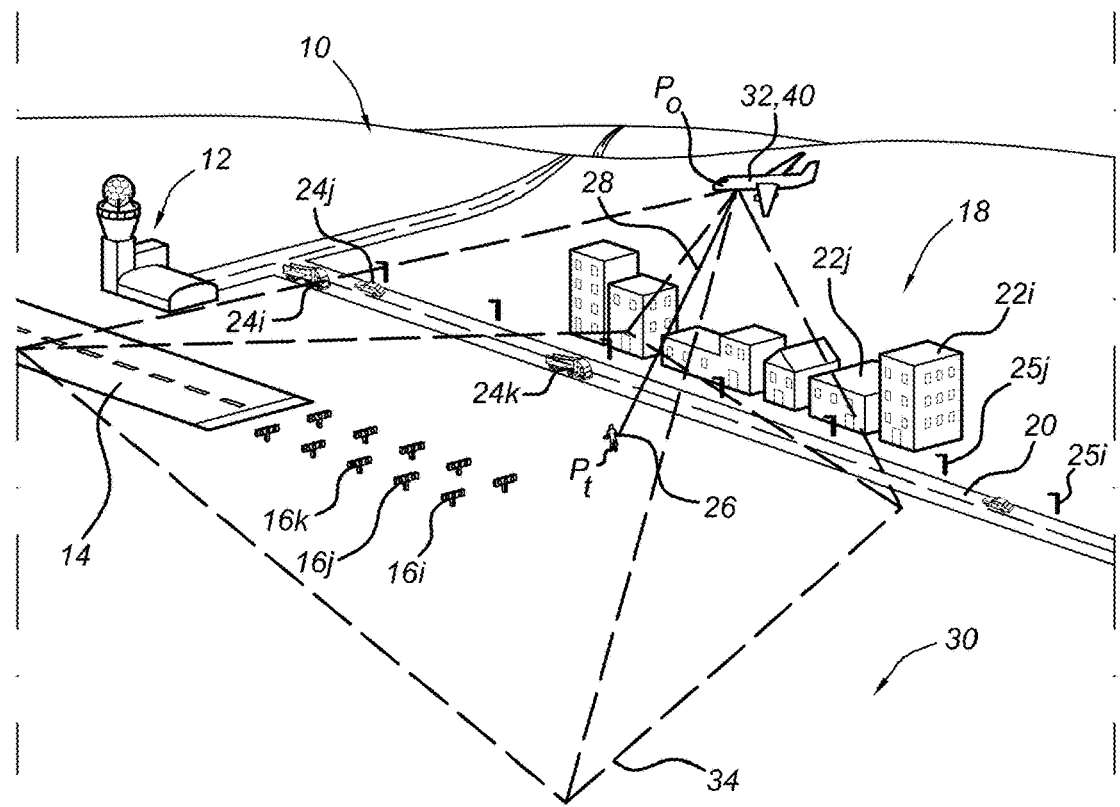
FIG. 1 schematically shows a perspective view of an aircraft with a system according to an embodiment.

FIG. 1 schematically shows a perspective view of a portion of the earth's surface 10, in which an airport 12 with a runway 14 and approach lights 16, and an urban area 18 with buildings 22 and roads 20 are situated. FIG. 1 also shows an aircraft 32 that traverses the airspace directly above this earth surface portion 10, and which carries a system 40 for locating a light source 26.

The light source 26 is located at a target position Pt at or near a portion of the earth surface 10, and emits a light beam 28 with high intensity (an order of magnitude higher than the intensity of stationary or quasi-stationary light sources in the vicinity). This light source 26 may be a laser device, for instance a flashlight-sized or pen-sized laser pointer. Source 26 is powerful enough to generate a beam of light 28 that can illuminate the aircraft 32 in a manner that is optically disruptive or even dangerous to people and/or sensor systems on-board the aircraft 32. The operator of the source 26 may be a person holding the source 26. The light beam 28 may be generated maliciously, e.g. to attack the aircraft 32, or may be unintentionally directed to the aircraft 32.

The system 40 is adapted to detect the light beam 28, when the beam impinges on a light-sensitive component of system 40, which is associated with an observation location Po. In this embodiment, the system 40 is located behind a window of the aircraft 32, for instance behind a window of the cockpit or of a passenger cabin. The window allows the beam 28 to pass towards the light-sensitive component of the system 40.

The exemplary system 40 comprises an image recording device, a database, and a processing unit, which are not indicated in FIG. 1 but explained with reference to FIG. 2. In this example, the image recording device is a photographic camera 44 that is configured to be pointed towards the earth surface 10, and configured to acquire images of the light beam 28 and of a portion 30 of the earth surface 10 surrounding the light source 26. A multitude of stationary or quasi-stationary other light sources 16, 24, 25 may be present in the direct vicinity of the light source 26 i.e. within the area corresponding to surface portion 30. In this example the reference light sources include the approach lights 16, automotive lighting 24 of vehicles that are moving on the roads 20, and road lighting 25 arranged along these roads 20. System 40 is configured to detect the impinging light of the beam 28, and to determine the location Pt of the source 26. The system 40 may further be configured to notify authorities of the determined location.

Figure 2:
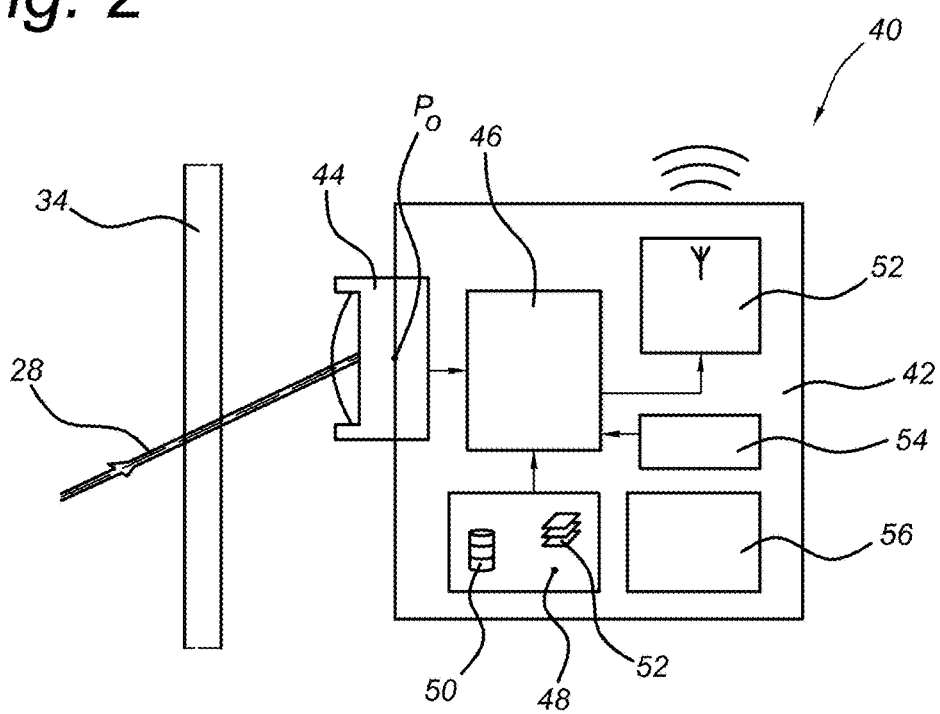
FIG. 2 presents a schematic view of a system according to an embodiment.

FIG. 2 schematically shows an embodiment of a stand-alone self-powered light source locating system 40, for instance the system described with reference to FIG. 1. This exemplary system 40 requires no integration with electrical and/or data systems of aircraft 32. The system 40 may for instance be formed by a mobile phone or tablet computer, which may be positioned behind a window 36 of the aircraft 32, and which is configured to execute a pre-installed software package. The exemplary system 40 comprises the camera 44, a processing unit 46, a memory unit 48, a power supply 56, and a communication unit 58. The processing unit 46 is communicatively coupled to the camera 44, the memory unit 48, the communication unit 58. Optionally, the system 40 may include a positioning unit 54, in signal communication with the processing unit 46.

In this example, camera 44 is a wide-angle photographic camera, which is directed towards the earth surface 10 and is configured to acquire images 74 of a surface portion 30 below and in the vicinity of the aircraft 32, which is within the camera's field of view 34 (FIG. 1). A ground-based target light source 26 and a part of the plurality of reference light sources 16, 24 may be present within this field of view 34.

The memory unit 48 stores a database in the form of one or more digital ground maps (DGM) 50, which comprises data describing geographic characteristics of terrain as well as geostationary structures and features present thereon, such as roads, buildings, infrastructure, etc. The data in the DGM 50 corresponds with one or more regions of the earth surface in which the disruptive light source 26 is likely to be situated, for instance in an urban region in the direct vicinity of a particular airport 12.

The DGM 50 may include digital representations of the layout of approach lights for various airports, among which the spatial arrangement of approach lights 16 associated with airport 12 shown in FIG. 1. The DGM 50 further includes digital representations of the location and layout of roads and structures in the direct vicinity of each respective airport, among which the spatial arrangement of roads 20 and buildings 22 associated with urban area 18 shown in FIG. 1. Preferably, the DGM 50 encompasses a detailed three-dimensional information of the buildings, since an attacker may be beaming from a building (e.g. through a window).

The spatial coverage provided by such a DGM 50 may at least include the laser free zones (LFZ) in the direct vicinities of the respective airports. For instance, according to U.S. FAA-definitions, the LFZ horizontally extends 3700 metres from the centreline of all runways, with additional 5560 metre extensions at each end of a runway, and vertically extends up to 610 metres above ground level.

The processing unit 46 is configured to receive the images acquired by the camera 44, and to compare the detected strings of vehicle lights on nearby roads 20 to the digital representations of nearby road patterns that are stored in the database 50. Roads and highways are particularly interesting, since geo-referenced ground maps for such structures are widely available as part of navigation software for portable devices. Alternatively or in addition, the processing unit 46 may be configured to compare detected approach lights 16 and/or beacon lights on nearby buildings 22 to the digital representations of approach light constellations and lighting information for nearby buildings that are stored in the database 50.

The system may optionally include a positioning unit 54 that is communicatively coupled to processing unit 46, to provide course positioning data to processing unit 46. Such positioning unit 54 may be used to estimate the instantaneous location Po of the aircraft 32 at the time of detecting an impinging beam 28 from source 26. Positioning unit 54 may be a GNSS receiver and processor, which is configured to calculate a geographical location of the system 40 by receiving GNSS signals from multiple satellites. Alternatively or in addition, this unit 54 may include an inertial navigation system (INS) sensor, tilt sensor, heading sensor, or the like. The measured instantaneous position data may be inaccurate, but may still be usable for the processing unit 46 to generate a first estimate of the optical centre and axis of the camera 44 for initializing the registration procedure between the acquired images 74 and the DGM 50.

The communication unit 58 incudes a wireless transmitter that may for instance rely on readily available cellular network services (e.g. based on 3G or 4G network technology).

Figure 3:
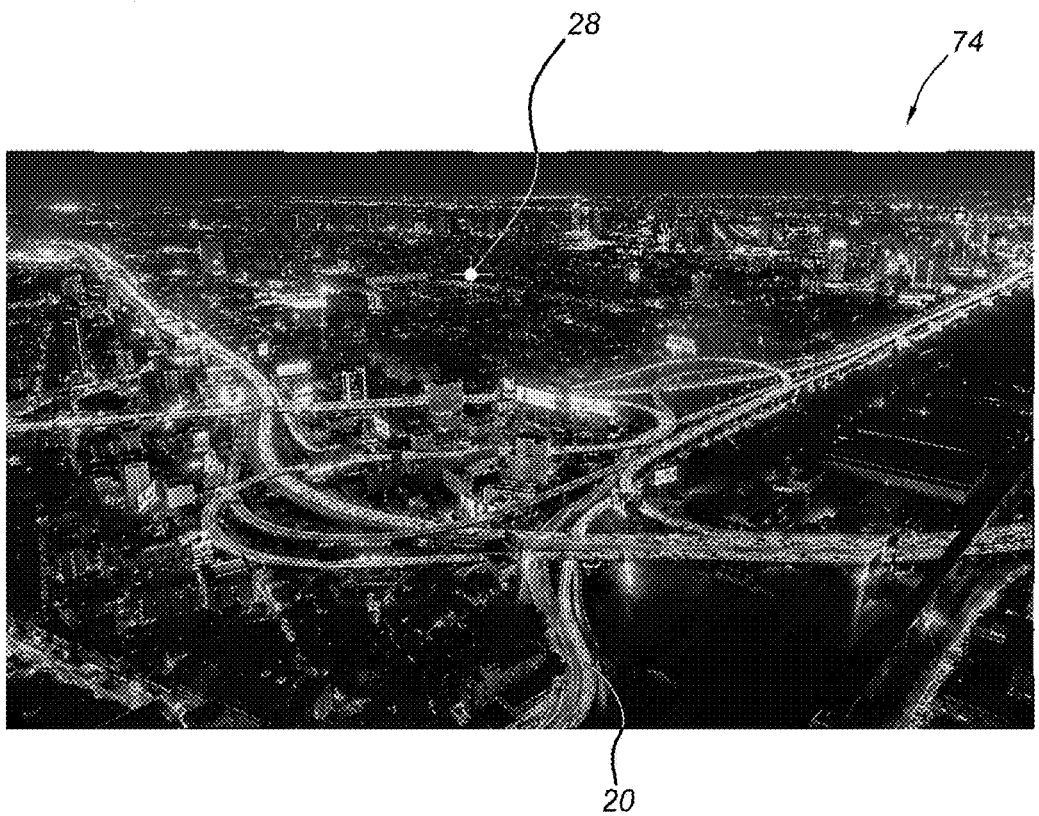
FIG. 3 presents an image depicting a perspective view of a portion of the earth surface.

FIG. 3 shows an exemplary image 74 as may be acquired by the camera unit 44, when located on-board the aircraft 32. The exemplary image 74 contains a perspective view of a portion of the earth surface within the camera's field of view 34. The image 74 covers part of a road network 20 that is arranged along the surface portion, and also shows a local intensity maximum associated with a light beam 28 that is directed towards the aircraft 32, and which briefly impinges on the camera sensor.

Figure 4:
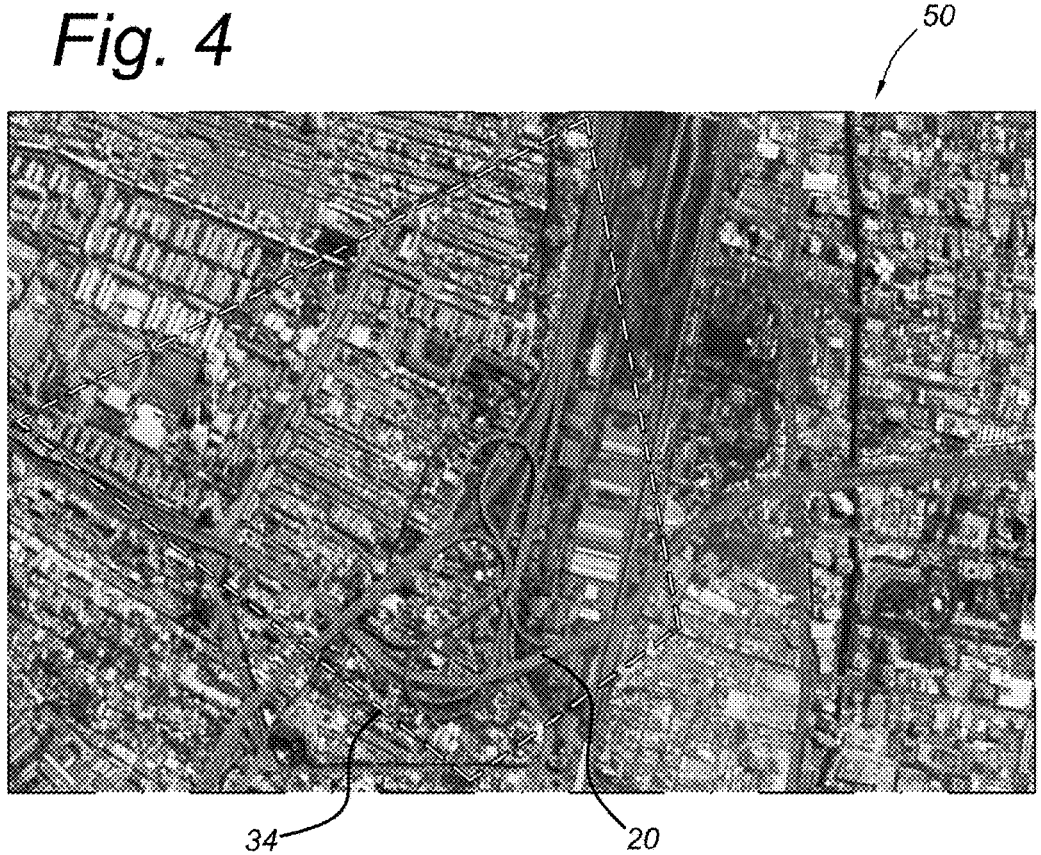
FIG. 4 presents an top view of a digital ground map.

FIG. 4 presents a top view of part of a digital representation of the surface portion and of structures associated with reference light sources (e.g. road network 20), which forms part of the digital ground map 50 stored in the system memory 48. An instantaneous estimate of the field of view 34 of camera 44 is shown in overlay. An exemplary procedure for finding such estimate is explained with reference to FIG. 6.

Figure 5:
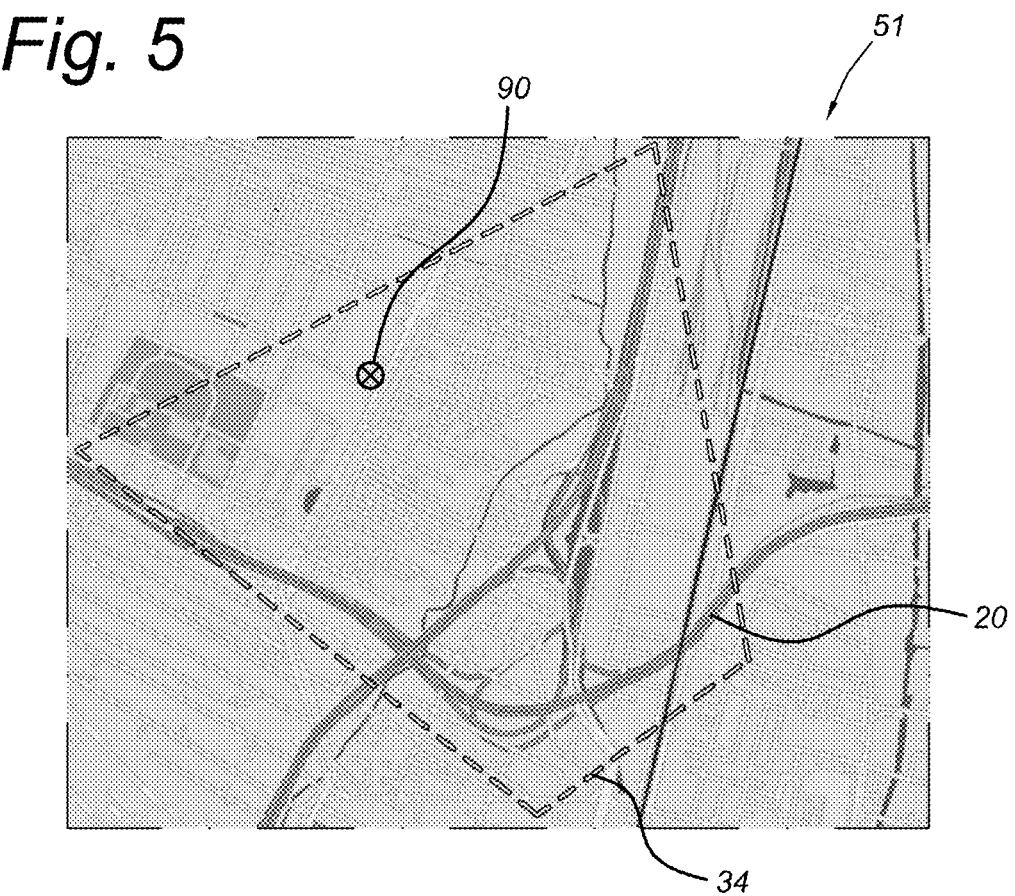
FIG. 5 presents a top view of another digital ground map.

FIG. 5 presents a top view of part of another digital ground map 51, which is more simplified and which may be used to facilitate visualization of the estimated location 88 of the target source 26, and communication of such information to third parties e.g. to authorities.

Figure 6:
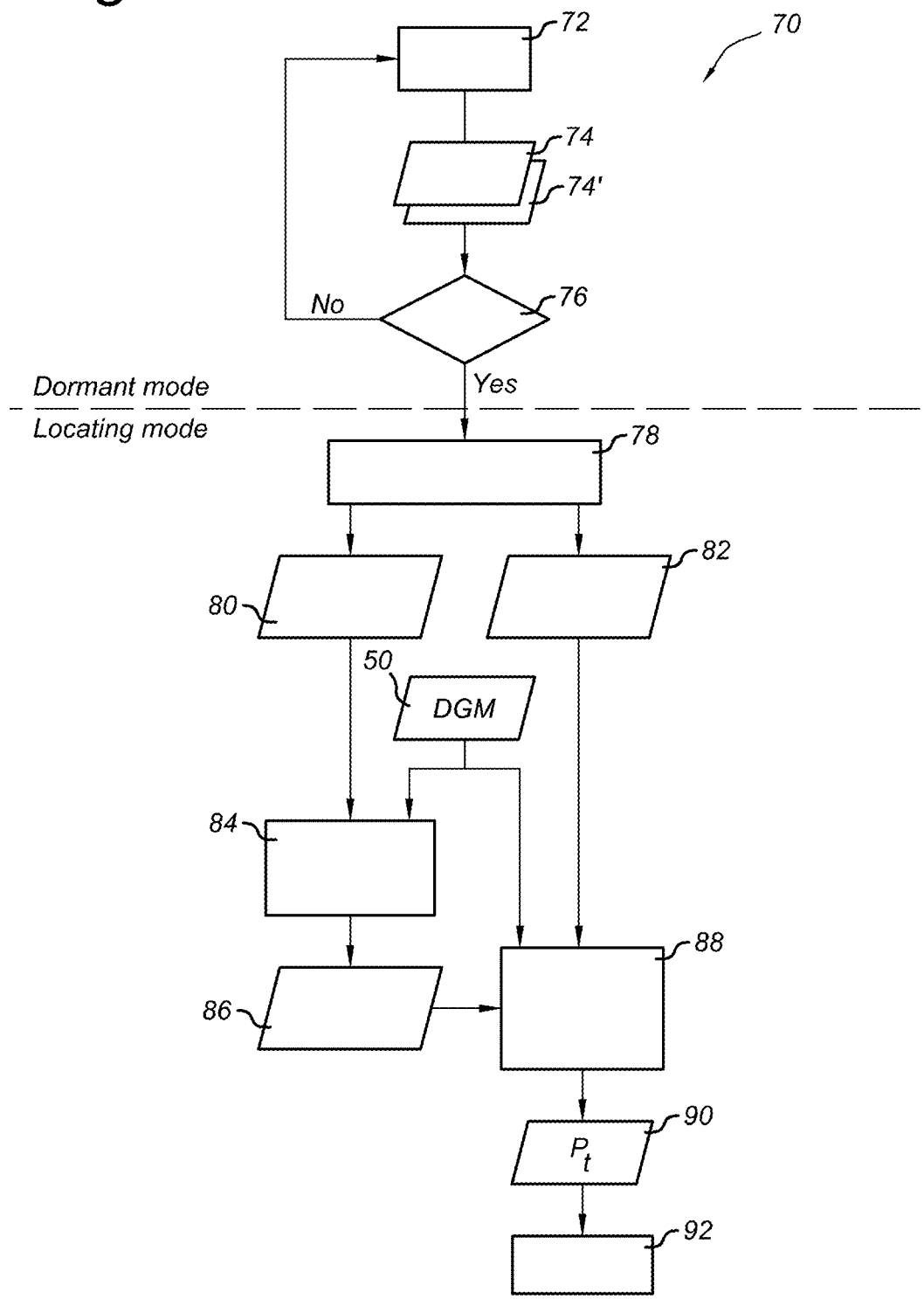
FIG. 6 presents a flowchart of a method for locating a light source, according to an embodiment.

FIG. 6 shows a process flowchart corresponding to an exemplary embodiment of a method 70 for locating a target light source 26, using a system 40 with a camera 44 (or other image recording device) that is located on-board an airborne aircraft 32. Item 72 represents the operation of camera 44, in which the camera 44 repeatedly acquires images 74 of portions 30 of the Earth's surface around and below the aircraft 32. Image acquisition 72 may occur continuously, intermittently at predetermined sample times, or when occurrence of a specific condition has been detected. The system 40 may for instance remain in a dormant mode until a sensor (e.g. the camera 44 or another light detector) registers the occurrence 76 of a high light intensity peak. Alternatively or in addition, the system 40 may be activated when the aircraft 32 is near an airport 12, so that the camera 44 can start capturing images 74 of the approach lights 16 of the runway 14, even when no (potential) laser attack has been registered yet. Preferably, two or more images 74 covering some of the reference light sources (e.g. lights 16 and/or 24, 25) are acquired from different perspectives, to facilitate locating of the various light sources in space.

In an initial partially dormant state of the system 40, the processing unit 46 processes 76 the acquired images 74 merely for peak detection purposes, for instance by a thresholding operation, in order to obtain course intensity information including only light intensity regions above a predetermined threshold value, or intensity histogram information. When a beam 28 originating from an interfering high-intensity light source 26 on the ground or in a building is detected by the camera 44, the acquired images 74 will reflect abrupt changes in the detected light intensity. Detection of predetermined peaks, such as temporal changes (e.g. flashing) and/or spatial patterns (e.g. blooming) in the images 74 may generate a trigger signal that causes system 40 to transition to a locating mode, and to initiate execution of other processing steps as described below.

Upon system activation, the processing unit 46 generally starts comparing 78, 84 the acquired images 74 to the geographical information in the DGM 50. In this locating mode, the processing unit 46 pre-processes 78 the acquired images 74, to obtain reference images 80 with thresholded light intensity regions from which the light intensity peaks have been excluded.

The acquired images 74 may initially be corrected for lens distortions and/or other imaging distortions, using known methods. Alternatively, the reference images 80 may be corrected for such distortions.

In registration step 84, the processing unit 46 registers the reference images 80 with the spatial light intensity profiles stored in the DGM 50, by iteratively searching through a transformation parameter space and finding an extremum for a predetermined registration metric, based on a comparison between the detected approach lights 16, automotive lighting 24, and road lighting 25 on the one hand, and the road patterns and approach light configurations stored in the DGM 50 on the other hand.

In one example, the registration algorithm 84 uses a set of synthetic view projection images 52 generated from the DGM 50. Each of the synthetic 52 view projection images is generated as if it is acquired from a predetermined viewpoint (e.g. position coordinates of the camera image centre, relative to a DGM-fixed or other earth-fixed reference frame) and viewing direction (e.g. pitch, yaw, and roll angles for of the optical axis through this image centre, relative to this fixed reference frame).

In this example, an iterative registration procedure is executed, in which the reference image 80 is compared with each view in the set of synthetic images 52, in order to determine the synthetic image that most closely correlates with the actual view of the image 74 or reference image 80.

This registration step 84 yields image registration parameters 86 that establish the (approximate) spatial transformation relations between the images 74 and the digital representation of the surroundings and reference lights 16, 24, 25 in the DGM 50.

Typically, during a laser attack, the beam 28 remains targeted on the same spot (e.g. on the camera 44) only for a very short time, although the beam may repeatedly return to this spot and/or oscillate around it. In the locating mode, the processing unit 46 may additionally subtract a current image 74 from another image 74' that directly precedes this image in time, in order to obtain a difference image 82 (i.e. peak intensity image), which may include only the abrupt change in detected light intensity. Depending on the beam characteristics and impingement location on the camera sensor 44, the approximate image pixel coordinates for the beam intensity maximum may be derivable from this difference image 82, and may then be used by the processing unit 46 in the registration step 84 to exclude the high intensity outlier associated with the light beam 28 from the image 74 to obtain the reference image 80, and avoid that the registration algorithm relies on this outlier and converges towards a wrong solution.

After the correct registration parameters 86 (or best approximation thereof) have been found, the location Pt of the bright light source 26 can be estimated 88 in terms of the coordinate system of the DGM 50.

It should be understood that the image representation of the beam 28 present in one or more of the acquired images 74, is not present in any of the synthetic view projection images 52 generated from the DGM 50. From the found registration parameters 86, a spatial correspondence is established between pixels in the acquired images 74 and pixels in the synthetic images 52. The coordinates of the pixels corresponding with the intensity maximum of the beam 28 in the acquired images 74 are thus transformed to coordinates of pixels in the synthetic images 52. As the viewpoint and viewing direction are (approximately) known from registration step 84, known optical ray tracing techniques can now be used to calculate the intersection of the nominal axis from the beam centre pixels with the terrain surface that is digitally represented in the DGM 50. This intersection defines the estimated position coordinates 90 for location Pt of the beam source 26 in terms of DGM-fixed coordinates. The accuracy of the coordinate estimation 88 depends on the pre-processing performance (e.g. image distortion compensation), the image registration process, as well as the geometric accuracy of the DGM 50. The estimated coordinates 90 for location Pt can then be reported 92 to authorities (e.g. police, military) by an automated system, for instance by wireless transmission using the communication unit 58. Alternatively or in addition, the estimated location Pt can for instance be marked with coordinates on a digital street map as used in mobile device applications.

Figure 7:
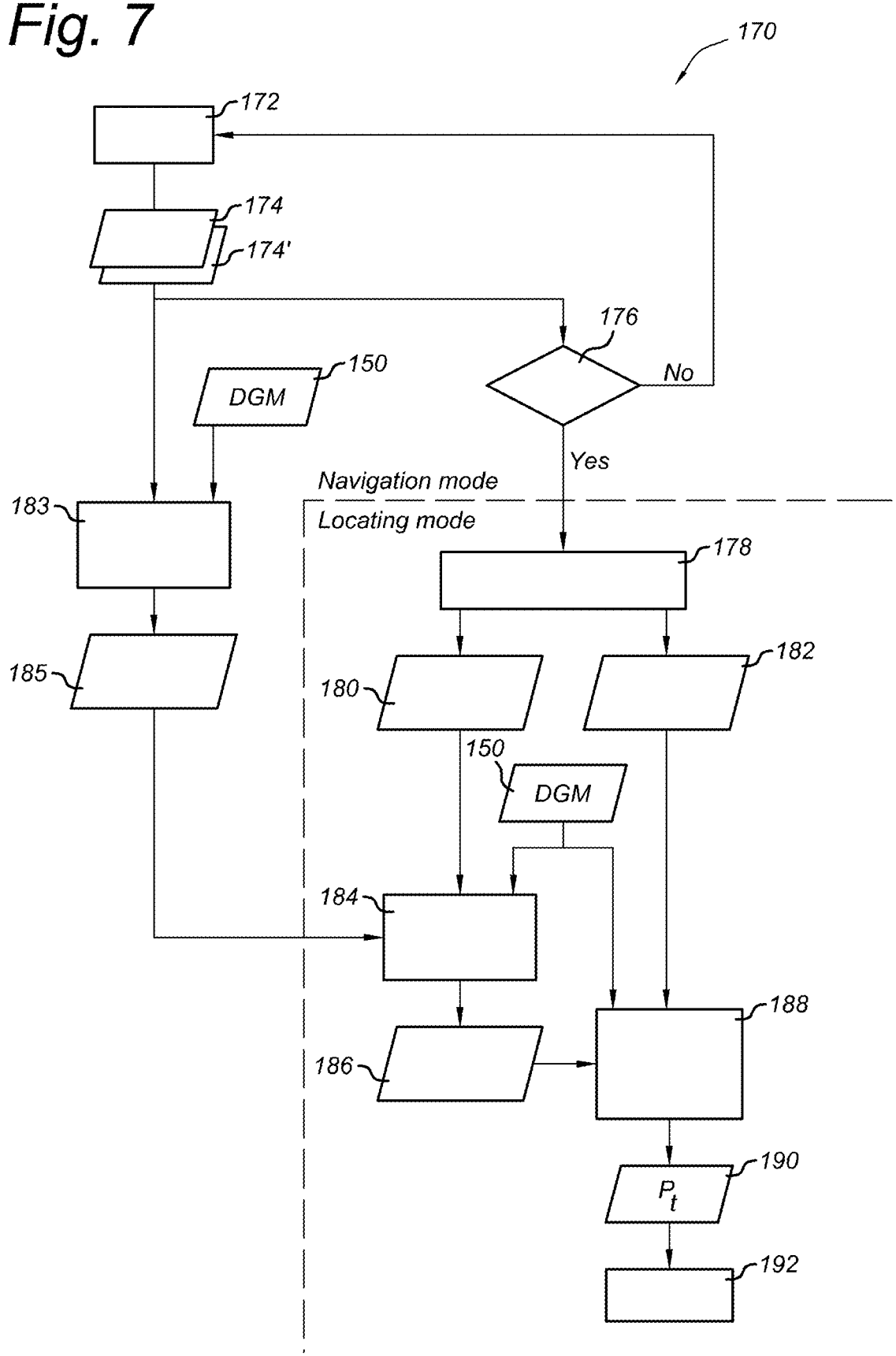
FIG. 7 presents a flowchart of an alternative method embodiment.

FIG. 7 shows a process flowchart corresponding to an alternative method embodiment for locating a target light source. Features and steps in the method described above with reference to the method embodiment shown in FIG. 6 may also be present in the method of FIG. 7, and will not all be discussed here again. For the discussion with reference to FIG. 7, like method features are designated with similar reference numerals preceded by 100 to distinguish the embodiments.

In this example, the locating system (e.g. system 40 from FIG. 2) is configured to initially operate in a "navigation mode", and to remain in this mode until a light peak condition or abnormality has been detected. In this navigation mode, the camera 44 is active and in step 172 repeatedly (e.g. continuously or intermittently) acquires images 174 of portions 30 of the Earth's surface around and below the aircraft 32. These images 174 may for instance be stored in a circular image data buffer (which may be part of memory 48), such that the memory space corresponding to the oldest acquired image recorded in the buffer is overwritten by the image acquired most recently. As above, the acquired images 174 may first be corrected for lens and/or other imaging distortions using known methods, before being stored.

In step 183 of this mode, the processing unit 46 continuously compares the acquired images 174 to the geographical information in the DGM 150. The processing unit 46 registers 183 the images 174 with the spatial light intensity profiles stored in the DGM 150, by iteratively searching through a transformation parameter space and finding an extremum for a predetermined registration metric, based on a comparison between the detected reference lights 16, 24, 25 on the one hand, and the structures and approach light configurations stored in the DGM 50 on the other hand. Registration algorithm 183 may operate in a similar manner and rely on generation of synthetic view projection images from the DGM 150 and iterative comparison with the actual image as in the previous embodiment, to obtain initial image registration parameters 185 and establish (approximate) spatial transformation relations between the images 174 and the digital representation of the surroundings and reference lights 16, 24, 25 in the DGM 150, before the occurrence of a light peak abnormality. At the same time, the processing unit 46 processes the acquired images 174 for peak detection purposes 176 (e.g. using thresholding or histogram information).

At step 176, the camera 44 may register the occurrence of a high light intensity peak in the images 174. Detection of predetermined peaks from a high-intensity light source 26 (e.g. flashing, blooming) in the images 174 may generate a trigger signal that causes system 40 to transition to a locating mode in which additional processing steps 178-192 are executed.

At step 178, the processing unit 46 may subtract a current image 174 from another image 174' that precedes this image in time. Here, the circular buffer 48 may be relied on, to retrieve a specific previous image 174' (e.g. acquired during navigation mode). The subtraction 178 yields a difference image 182, which may include only the region with maximum beam intensity. Determination of approximate pixel coordinates for the beam maximum may proceed as in the previous embodiment. Simultaneously, reference images 180 that exclude the beam peak intensity can be derived and used by the registration algorithm 184 to derive transformation parameters 186 in a similar manner as described above. In this case, the registration algorithm 184 obtains the approximate transformation parameters 185 derived during the preceding registration 183 in navigation mode, and uses these parameter 185 as initial values for the current registration step 184 in the location mode. The location Pt of the bright light source 26 in terms of the coordinate system of the DGM 150 can thus be estimated 188 more quickly. Reporting to authorities and/or marking on a digital street map can proceed as described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

In the above exemplary embodiments, the position of the localization system (and associated observation location) was associated with an airplane. In alternative embodiments, the system may be employed in various other air flight capable devices, such as helicopters, zeppelins, gliders, or drones.

In the above examples, the system was implemented in a portable device including a camera, e.g. a smart-phone or tablet computer. Such locating system does not require integration into the structure and/or avionics system of the aircraft, and does not need certification by air traffic authorities. Alternatively, the system may be implemented in an apparatus that is mechanically separate from but communicatively coupled to an image recording device (e.g. a small camera). When implemented in a portable device, a device holder may be provided for mounting the device or its camera in a fixed position behind a window of the aircraft. In other embodiments, the system may be integrated in the aircraft structure. For instance, the system may be mounted on a lower surface of the aircraft, located behind a transparent portion that allows passage of laser light to the camera. The locating system may be communicatively coupled to the aircraft, and have access to images already provided by the aircraft's sensors or data systems, such as the video streams acquired by landing gear cameras.

In alternative method implementations, registration of acquired images with the DGM and localization of target light source coordinates may proceed using other techniques known in the art, such as convolutional neural network. A CNN-based method is for instance described in "Complete Model for Automatic Object Detection and Localisation on Aerial Images using Convolutional Neural Networks" by D. Bozic-Stulic et al in JCommSS 14(1), March 2018.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method steps or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

Execution of the registration algorithm steps may also involve cloud-based processing. The acquired images (or preprocessed and/or compressed versions of these images) may be sent dynamically to the cloud using wireless (e.g. 4G, 5G, satellite) communication for subsequent rapid processing. The registration and/or localization results may then be transmitted back to the system (e.g. in the plane). When a bright source anomaly is detected in the images, its estimated location Pt may also be directly reported to authorities.

LIST OF REFERENCE SYMBOLS 10 earth surface
12 airport
14 runway
16 reference light (e.g. approach light)
18 urban area
20 road
22 building
24 further reference light (e.g. car lights)
25 further reference light (e.g. road lighting)
26 target light source
28 light beam
30 surface portion
32 aircraft
34 field of view
36 window
40 system
42 housing
44 image recording device (e.g. camera)
46 processing unit
48 memory
50 digital ground map (DGM)
51 further DGM
52 synthetic projection images
54 positioning unit
56 power supply
58 communication unit
70 method
72 acquire images
74 image
76 peak detection
78 pre-process image
80 reference image
82 difference image (e.g. peak intensity image)
84 register images with DGM
86 registration parameters
88 estimate source location
90 location estimate
92 transmit location estimate
183 image registration (navigation mode)
185 registration parameters (navigation mode)
A optical axis
Po observer location
Pt target location

The invention claimed is:

1. A method for locating a target light source, wherein the target light source is located at or near a surface portion of earth and amongst a plurality of reference light sources that are arranged along the surface portion of the surface of the earth, and the target light source emits light with a peak radiant intensity that exceeds a peak radiant intensity of the plurality of reference light sources by at least one order of magnitude, and the method comprising: acquiring, with an image recording device located at or in an airborne aircraft at an observation location above the surface portion of the earth one or more images of the light and light emitted by a portion of the plurality of reference light sources; comparing, with a processing unit, the one or more images and a digital ground map, DGM, wherein the DGM includes digital representations of the surface portion of the earth and of structures associated with the plurality of reference light sources; and estimating, with the processing unit, a location of the target light source relative to the plurality of reference light sources, based on the comparison between the one or more images and the DGM.

2. The method according to claim 1, wherein the surface portion includes roads, and wherein the plurality of reference light sources include road lighting arranged along the roads, and/or automotive lighting of vehicles moving on the roads.

3. The method according to claim 1, wherein the DGM is geo-referenced relative to an earth-fixed coordinate system, wherein the structures associated with the plurality of reference light sources are geo-stationary, the method further comprising:
determining geographic coordinates for the estimated location of the target light source, based on the comparison between the one or more images and the DGM; and
optionally communicating the geographic coordinates for the estimated location to authorities.

4. The method according to claim 1, wherein comparing the one or more images and the DGM includes:
iteratively generating view projection images from the DGM, each view projection image being representative of a specific location and viewing angle for the image recording device;
for each generated view projection image, comparing the view projection image to at least one of the one or more images, and calculating a degree of correspondence;
for the at least one of the one or more images, identifying a closest projection image that has a highest degree of correspondence with the at least one of the one or more images;
deriving viewing transformation parameters for the closest projection image, and
deriving geographic coordinates for the estimated location for the target light source, from the location of the target light source in the one or more images, the viewing transformation parameters, and the DGM.

5. The method according to claim 4, wherein comparing the one or more images and the DGM further includes, prior to iteratively generating view projection images:
accessing a set of initial view projection images generated from the DGM, the view projection images representative of typical locations and viewing angles for the image recording device located at or in the airborne aircraft, based on a predetermined flight trajectory for the airborne aircraft;
comparing each of the set of initial view projection images to at least one of the one or more images, and calculating a set of initial degrees of correspondence;
identifying, from the set of initial degrees of correspondence, a closest initial view projection image having a highest initial degree of correspondence with the at least one of the one or more images;
obtaining course viewing transformation parameters for the closest projection image, and using the course viewing transformation parameters as initialization values for the iteratively generating of the view projection images from the DGM.

6. The method according to claim 1, further comprising:
pre-processing the one or more images to exclude from intensity information of the one or more images associated with the light from the target light source while retaining intensity information associated with the plurality of reference light sources;
wherein comparing the one or more images and the DGM is based on the intensity information associated with the plurality of reference light sources, and ignores intensity information associated with the light from the target light source.

7. The method according to claim 4, wherein estimating the location of the target light source comprises:
identifying, in the one or more images, peak intensity coordinates associated with the light from the target source;
for the one or more images, deriving an associated optical center and viewing axis for the image recording device relative to a reference frame of the DGM, based on the viewing transformation parameters derived for the closest projection image;
using optical ray tracing to calculate a point of intersection between a nominal axis extending through the peak intensity coordinates and parallel with the viewing axis, and the digital representation of the surface portion in the DGM, and
determining geographic coordinates for the point of intersection, and equating the geographic coordinates with the estimated location for the target light source.

8. The method according to claim 7, wherein the DGM further includes three-dimensional digital representations of buildings that are located in or on the surface portion of the earth, and wherein estimating the location for the target light source includes:
using optical ray tracing to calculate a point of intersection between a nominal axis extending through the peak intensity coordinates and parallel with the viewing axis and the digital representations of the surface portion and the buildings in the DGM, and
when the nominal axis first intersects a digital representation of a target building in the DGM, determining geographic coordinates including height for the point of intersection, the geographic coordinates optionally including an estimate for a chamber and floor number in the target building.

9. The method according to claim 1, further comprising:
pre-processing a temporal sequence of the one or more images to identify, in the one or more images, approximate image pixel coordinates for peak intensity associated with the light from the target light source, by determining if the peak intensity of the light exceeds peak intensities of the plurality of reference light sources by at least one order of magnitude within at least one of the one or more images, and by determining if the peak light intensity of the light fluctuates in time by at least one order of magnitude throughout the sequence of the images.

10. A system for locating a target light source, wherein the target light source is located at or near a surface portion of earth and amongst a plurality of reference light sources that are arranged in a predetermined and essentially stationary spatial distribution along the surface portion of the earth, and the target light source emits light with a peak radiant intensity that exceeds a peak radiant intensity of the plurality of reference light sources by at least one order of magnitude, wherein an observation location is above and remote from the surface portion of the earth, the system comprising:
an image recording device, configured to acquire images of the target light source and of a surrounding part of the plurality of reference light sources;
a memory unit, provided with a digital ground map, DGM, which includes digital representations of the surface portion of the earth and a spatial distribution of the plurality of reference light sources; and
a processing unit, configured to:
receive the images from the image recording device, receive the DGM from the memory unit, and to compare the images and the DGM, and
estimate a location of the target light source at or near the surface portion of the earth and relative to the plurality of reference light sources based on the comparison.

11. The system according to claim 10, wherein the image recording device has an ultra-wide field of view with an azimuthal coverage of 360° around a central image recording device axis and an elevational coverage ranging from 0° to at least 90° relative to an image recording device axis, and wherein the image recording device is mounted on a lower side on or in an aircraft fuselage, with the image recording device axis pointing downwards.

12. The system according to claim 10, further comprising a wireless communication unit, configured to transmit the estimated location to authorities.

13. An aircraft, comprising a system for locating a target light source from an observation location, the system comprising:
an image recording device, configured to acquire images of the target light source and of a surrounding part of a plurality of reference light sources;
a memory unit, provided with a digital ground map, DGM, which includes three-dimensional digital representations of a surface portion of earth and a spatial distribution of the plurality of reference light sources; and
a processing unit, configured to:
receive the images from the image recording device, receive the DGM from the memory unit, and compare the images and the DGM, and
estimate a location of the target light source at or near the surface portion of the earth and relative to the plurality of reference light sources based on the comparison.

14. A non-transitory computer readable medium storing instructions, which when executed by one or more processors of a system, causes the system to:
acquire, with an image recording device located at or in an airborne aircraft at an observation location above a surface portion of earth one or more images of light and light emitted by a portion of a plurality of reference light sources;
compare, with a processing unit, the one or more images and a digital ground map, DGM, wherein the DGM includes digital representations of the surface portion of the earth and of structures associated with the plurality of reference light sources; and
estimate, with the processing unit, a location of a target light source relative to the plurality of reference light sources, based on the comparison between the one or more images and the DGM,
wherein the target light source is located at or near the surface portion of the earth and amongst the plurality of reference light sources that are arranged along the surface portion of the earth, and the target light source emits the light with a peak radiant intensity that exceeds the peak radiant intensity of the plurality of reference light sources by at least one order of magnitude.

\* \* \* \* \*